(12) United States Patent
Woo et al.

(10) Patent No.: US 12,524,575 B2
(45) Date of Patent: Jan. 13, 2026

(54) SYSTEM AND METHOD FOR DETECTING DIGITAL CONTENT FORGERY USING WEB ASSEMBLY-BASED BLOCKCHAIN PLATFORM

(71) Applicant: HANBITSOFT INC., Seoul (KR)

(72) Inventors: Eun-Ju Woo, Seoul (KR); Jin Choi, Seoul (KR)

(73) Assignee: HANBITSOFT INC., Seoul (KR)

( * ) Notice: Subject to any disclaimer, the term of this patent is extended or adjusted under 35 U.S.C. 154(b) by 275 days.

(21) Appl. No.: 18/025,920

(22) PCT Filed: Nov. 20, 2020

(86) PCT No.: PCT/KR2020/016451
§ 371 (c)(1),
(2) Date: Mar. 13, 2023

(87) PCT Pub. No.: WO2022/107923
PCT Pub. Date: May 27, 2022

(65) Prior Publication Data
US 2023/0351051 A1 Nov. 2, 2023

(30) Foreign Application Priority Data
Nov. 19, 2020 (KR) .................. 10-2020-0155202

(51) Int. Cl.
*G06F 21/64* (2013.01)
*G06F 21/10* (2013.01)
*G06F 21/12* (2013.01)

(52) U.S. Cl.
CPC .............. *G06F 21/64* (2013.01); *G06F 21/10* (2013.01); *G06F 21/125* (2013.01)

(58) Field of Classification Search
CPC ......... G06F 21/64; G06F 21/10; G06F 21/125
See application file for complete search history.

(56) References Cited

U.S. PATENT DOCUMENTS 9,294,444 B2 * 3/2016 O'Hare ................. G06F 21/606
10,121,025 B1 * 11/2018 Rice ........................ G06F 21/10
(Continued)

FOREIGN PATENT DOCUMENTS

| KR | 10-1938878 B1 | 1/2019 |
| KR | 10-2020-0057316 A | 5/2020 |

(Continued)

OTHER PUBLICATIONS

International Search Report for PCT/KR2020/016451 mailed Feb. 3, 2022 from Korean Intellectual Property Office.

*Primary Examiner* — John W Hayes
*Assistant Examiner* — Zehra Raza
(74) *Attorney, Agent, or Firm* — Revolution IP, PLLC (57) ABSTRACT

A system for determining forgery or falsification of a digital content using a WebAssembly-based blockchain platform including a blockchain network, includes a client device configured to provide an original digital content to a relay server; the relay server configured to generate a hash for the original digital content provided from the client device and transmit the hash to a blockchain network; and a plurality of nodes configured to perform mining on a block including a transaction generated by distribution of a smart contract for the original digital content to distribute the mined block on the network, and perform comparison and verification between the smart contract for the original digital content included in the mined block and a smart contract for a digital content created using the original digital content, on a WebAssembly virtual machine.

7 Claims, 6 Drawing Sheets

(56) References Cited

U.S. PATENT DOCUMENTS

| | | |
|---|---|---|
| 11,010,303 B2* | 5/2021 | Yao .................. H04L 63/12 |
| 2018/0241565 A1* | 8/2018 | Paolini-Subramanya .................. H04L 9/3239 |
| 2020/0159889 A1* | 5/2020 | Chui .................. G06F 21/105 |
| 2022/0103533 A1* | 3/2022 | Srinivasan .............. H04L 63/02 |

FOREIGN PATENT DOCUMENTS

| | | |
|---|---|---|
| KR | 10-2020-0084735 A | 7/2020 |
| KR | 10-2020-0089749 A | 7/2020 |
| KR | 10-2020-0103394 A | 9/2020 |
| KR | 10-2163930 B1 | 10/2020 |

* cited by examiner

SYSTEM AND METHOD FOR DETECTING DIGITAL CONTENT FORGERY USING WEB ASSEMBLY-BASED BLOCKCHAIN PLATFORM

CROSS REFERENCE TO PRIOR APPLICATIONS

This application is the 35 U.S.C. 371 national stage of International application PCT/KR2020/016451 filed on Nov. 20, 2020; which claims priority to Korean Patent Application No. 10-2020-0155202 filed on Nov. 19, 2020. The entire contents of each of the above-identified applications are hereby incorporated by reference.

TECHNICAL FIELD

The present invention relates to a system and a method for determining forgery of a digital content using a WebAssembly-based blockchain platform, and more particularly, to a system and a method for determining forgery of a digital content using a WebAssembly-based blockchain platform, capable of effectively preventing a deep fake of a digital content such as video, image, voice, or text.

BACKGROUND ART

Blockchain is also called a public transaction ledger and is a technology for preventing hacking that may occur when trading in cryptocurrency. While existing financial companies store transaction records on a centralized server, blockchain uses a scheme of sending transaction details to all users participating in transactions and comparing the transaction details upon every transaction to prevent data forgery. Blockchain is applied to Bitcoin, which is a representative online cryptocurrency. Bitcoin transparently records transaction details in a ledger that anyone can read, and several computers using Bitcoin verify the record once every 10 minutes to prevent hacking.

In the process of processing Bitcoin online, blocks and blockchain play a key role. The blockchain technology has a structure in which one block containing transaction information mutually references a previous block and a next block as unique values to be connected like a chain, and is a technology having a characteristic of a specialized form in which peers participating in a P2P network or participants for generating a transaction store all blocks generated in the P2P network, thereby enabling anyone to inquire transaction details, and using a procedure of compensating for goods issued by the network itself to a person who proves work using a unique proof-of-work method and a procedure of balance addition/subtraction in a debit and credit form.

Meanwhile, as the AI technology develops, fake products, so-called deep fake, resulting from learning data by artificial intelligence and various problems thereby are emerging as social issues. Specifically, the deep fake may cause invasion of personal rights and cause social, economic and cultural difficulties due to fake news delivery. The above deep fake problem will emerge further as technologies of the fourth industrial revolution develop.

There are attempts to utilize the blockchain technology to solve the deep fake problem. However, the current blockchain technology can simply implement only the source display and tracking function for the original, and there is a technical limit to maximizing the characteristics of the blockchain such as integrated management or tracking of secondary works produced with the permission of the original copyright holder so as to solve the deep fake problem fundamentally.

PRIOR ART DOCUMENT

Patent Document (Patent Document 1) KR Patent Application Publication No. 10-2020-0089749

DISCLOSURE

Technical Problem

An object of the present invention is to provide a system for determining whether a digital content such as video, image, voice or text is forged or falsified by verifying data of an original digital content and verifying a smart contract of a digital content produced using the original digital content, and a method for determining whether the digital content is forged or falsified using the same.

Further, an object of the present invention is to provide a system for determining whether a digital content, which is designed to facilitate the tracking of original work and secure the source, is forged or falsified, and a method for determining whether the digital content is forged or falsified using the same.

Further, an object of the present invention is to provide a system for determining whether a digital content is forged or falsified, which is driven based on a WebAssembly to have a high degree of freedom in selecting a smart contract language and operable in a web environment to have a performance close to a native, and a method for determining whether the digital content is forged or falsified using the system.

Technical Solution

In order to solve the above problems, the present invention relates to a system and a method for determining forgery of a digital content using a WebAssembly-based blockchain platform.

The system for determining forgery of a digital content may include a block chain network including: a client device configured to provide an original digital content to a relay server; a relay server configured to generate a hash for the original digital content provided from the client device and transmit the hash to a blockchain network; and a plurality of nodes configured to perform mining on a block including a transaction generated by distribution of a smart contract for the original digital content to distribute the block on the network, and perform comparison and verification, on a WebAssembly virtual machine, between the smart contract for the original digital content included in the mined block and a smart contract for the digital content created using the original digital content.

In one example, the original digital content may be any one of a digital content consisting of voice content, video content, image content, text content, and a combination thereof.

In one example, the relay server includes first and second relay servers each provided with the same original digital content from the client device, wherein the first and second relay servers may perform mutual verification for the hash of the provided digital content.

In one example, the relay server may be a IPFS server which is a distributed file system having a client-client structure composed of a plurality of IPFS nodes. In this case, the IPFS server may distributively store the original digital content in the IPFS nodes and generate an IPFS hash for the original digital content. In addition, the IPFS hash may include a unique hash value for the original digital content, a secret hash key, owner information of the original digital content, and a contract for use of the original digital content.

In one example, the system for determining the forgery or falsification of the digital content may further include a copyright holder information providing server for extracting and separately storing information on the copyright holder from the hash of the original digital content provided from the client device so that a third user may view the information on the copyright holder of the original digital content with the naked eye.

In one example, each of the nodes may include a transaction having a WebAssembly module driven on a WebAssembly virtual machine as a WebAssembly module in which a smart contract source code is compiled and converted into a binary byte code.

In one example, each of the nodes may perform comparison and verification, on the WebAssembly virtual machine, between a smart contract for the original digital content acquired through decompiling of the WebAssembly module and the smart contract for the digital content produced using the original digital content.

In one example, the nodes may include a first node group that mines a block including a transaction for generating the smart contract for the original digital content; and a second node group that performs verification, on the WebAssembly virtual machine, between a smart contract for the original digital content included in the mined block and a smart contract for a digital content produced using the original digital content.

The method for determining forgery or falsification of a digital content using a WebAssembly-based blockchain platform is performed by using a system for determining forgery or falsification of the digital content, and includes: generating, by a relay server, a hash for an original digital content provided by a client device and transmitting the hash to a blockchain network; generating, by the client device having provided the original digital content, a smart contract for the original digital content by using the hash generated in the relay server as an attribute, and generating a transaction for distributing the smart contract on the blockchain network; mining, by any one of a plurality of nodes in the blockchain network, a block including the transaction generated by the distribution of the smart contract to receive a reward, and recording, on the blockchain, the block including the transaction generated by the distribution of the smart contract; and performing, by any one of the nodes in the blockchain network, comparison and verification of a smart contract for the original digital content included in the mined block and a smart contract for a digital content produced using the original digital content, on the WebAssembly virtual machine.

In addition, the method for determining forgery or falsification of a digital content using a WebAssembly-based blockchain platform may further include: performing mutual verification of a hash of the digital content provided by each relay server that has received the original digital content.

Advantageous Effects

According to the present invention, the system and the method for determining forgery or falsification of a digital content can verify the original digital content itself and clearly identify whether a digital content derived from the original digital content is forged or falsified.

In addition, the system and the method for determining forgery or falsification of a digital content can easily track original works and ensures sources of secondary works.

Further, the system and the method for determining forgery or falsification of a digital content can have a high degree of freedom in selecting a smart contract language and operate in a web environment with near-native performance, so that system versatility and expandability can be improved.

The advantageous effects of the present invention are not limited to the above-mentioned ranges.

MODE FOR INVENTION

Hereinafter, the present invention will be described in more detail with reference to the drawings and examples.

In this specification, a singular expression includes a plurality of expressions unless otherwise specified.

The terms used in the present specification are selected from general terms currently widely used in consideration of the functions in the present invention, but may vary depending on the intention of a those skilled in the art, the precedents, the emergence of new technologies, and the like. In addition, in a specific case, terms arbitrarily selected by the applicant may be used, and in this case, the meaning thereof will be described in detail in the corresponding description of the present invention. Therefore, the terms used in the present invention will be defined based on the meanings of the terms and the overall contents of the present invention, other than just the names of the terms.

Since the embodiments of the present invention may be variously modified and there may be various embodiments, specific embodiments will be illustrated in the drawings and described in detail in the detailed description. However, this is not intended to limit the scope to specific embodiments, and will be understood as including all the modifications, equivalents, and substitutes included in the scope of the inventive idea and the technology. In describing the embodiments, the detailed description thereof will be omitted when it is determined that the detailed description of a related known technology may obscure the gist.

In this specification, it will be understood that the term "include", "comprise" or the like indicates that a feature, a number, a step, an operation, a component, a part, or a combination thereof described in the specification is present, but does not exclude the possibility of presence or addition of one or more other features, numbers, steps, operations, components, parts, or combinations thereof in advance.

In the specification, it will be understood that the term "consist of" or "consisting of" is used to emphasize that a configuration other than a feature, a number, a step, an operation, a component, a part, or a combination thereof described in the specification is not included, and excludes the possibility of presence or addition of one or more other features, numbers, steps, operations, components, parts, or combinations thereof other than the above configuration.

The present invention relates to a system and a method for determining forgery or falsification of a digital content using a WebAssembly-based blockchain platform.

The system according to the present invention refers to a system for using a blockchain platform to distinguish a person who has obtained a proper permission for an original digital content from a person who does not, and the system uses a WebAssembly-based blockchain platform.

A technical feature of the system and the method according to the present invention is that verification of an original digital content and verification of a smart contract for a digital content produced using the original digital content are implemented.

In addition, another technical feature of the system and the method according to the present invention is that a blockchain network in included in which a smart contract for a digital content produced using an original digital content is sub-linked to a smart contract for the original digital content so as to easily track original work of secondary work and secure the source.

The system and the method according to the present invention having the technical features described above use the WebAssembly-based blockchain platform, so as to have a high degree of freedom in selecting a smart contract language and operate in a web environment with near-native performance. Meanwhile, the term "WebAssembly" used herein refers to a web standard developed by the W3C foundation so as to be driven in a stack-based virtual machine that compiles a programming language and defines the compiled programming language as a binary format so that a program created in a low-level source programming language such as C, C+, Go, or Rust may be executed in a web browser.

Figure 1:
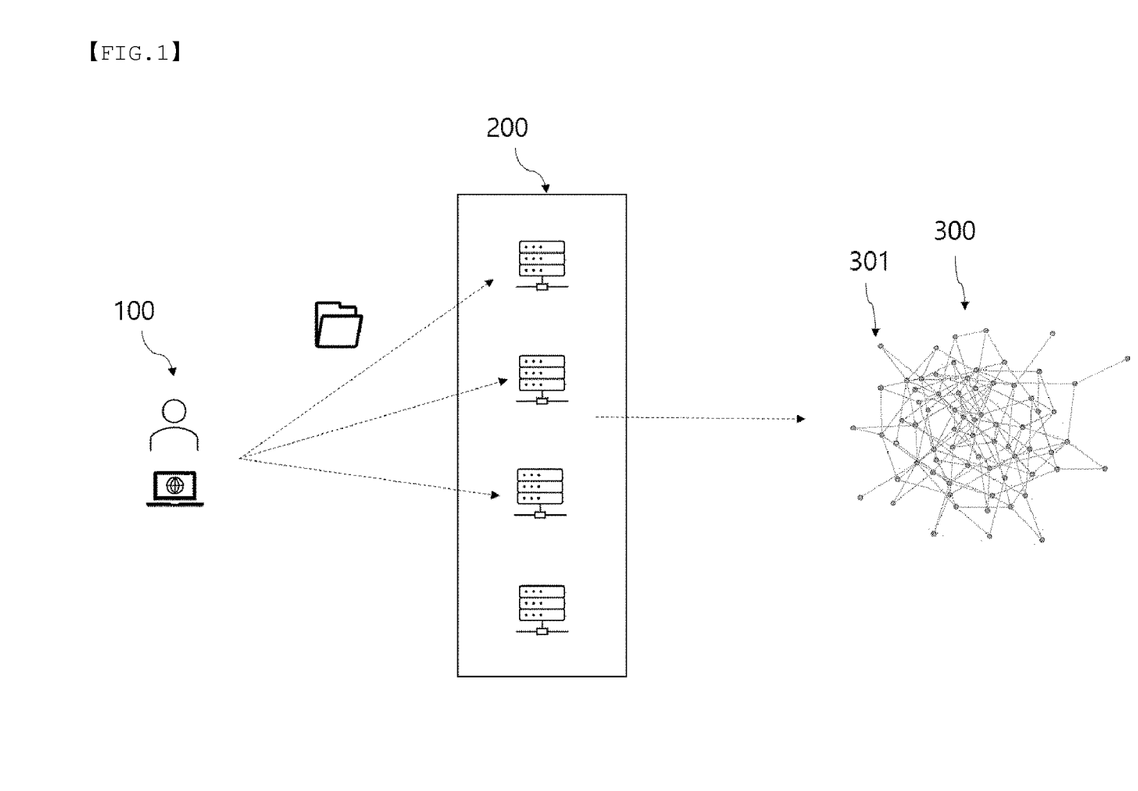
FIG. 1 is a diagram for explaining the overall structure of a system for determining forgery or falsification according to the present invention.

FIG. 1 shows a diagram for describing the overall structure of the system for determining forgery of a digital content using a WebAssembly-based blockchain platform according to the present invention.

As shown in FIG. 1, the system for determining forgery or falsification of a digital content using a WebAssembly-based blockchain platform according to the present invention includes a client device 100; a relay server 200; and a blockchain network 300.

The client device 100 serves to provide an original digital content to the relay server 200.

The client device 100 may be designed such that a copyright holder of the original digital content or a user who has obtained permission from the copyright holder uploads created digital contents on the blockchain network 300.

The client device 100 may be, for example, a personal computer (PC) or a smart phone, but is not limited thereto, and may be any kind of device capable of implementing a role of transmitting the original digital content to the blockchain network 300 through the relay server 200 in a web environment.

The digital content transmitted by the client device 100 is, for example, a digital content including video content, audio content, image content, text content, or a combination thereof, and may be transmitted, modified, copied, distributed, or viewed in the form of a digital file.

In a specific example, the original digital content may be any one of a digital content including voice content, video content, image content, text content, and a combination thereof.

The relay server 200 serves to transfer the original digital content provided from the client device 100 to the blockchain network 300.

Specifically, the relay server 200 generates a hash for the original digital content provided from the client device 100 and transmits the hash to the blockchain network 300.

The hash transmitted by the relay server 200 may be referred to as an attribute of a smart contract for the original digital content, and may include a unique hash value for the original digital content, a secret hash key, owner information of the original digital content, and a contract for use of the original digital content.

The hash generated by the relay server 200 is transmitted to the blockchain network 300, and the hash transmitted to the blockchain network 300 includes a unique hash value and a secret hash key, which enable the copyright holder of the original digital content to access the digital content uploaded by the copyright holder of the original digital content, and a contract for owner information and use provided to a third person who intends to use the original digital content.

The contract for the use of the original digital content includes contents on whether the use of the original digital contents is permitted, and a range or condition thereof, and may be set and changed by the copyright holder of the original digital content and may be reflected in the smart contract.

The hash generated by the relay server 200 is transmitted to the client device 100, and the client device 100 receiving the hash may access the original digital content uploaded by the client device using the unique hash value and the secret hash key included in the hash.

The relay server 200 serves to verify the integrity of original digital content data provided from the client device 100 in addition to the above-described function of transmitting the hash for the original digital content.

Specifically, the relay server 200 includes at least two sub-relay servers or nodes that transfer the original digital content provided from the client device 100 to the blockchain network 300, and each sub-relay server or node that receives the original digital content provided from the client device 100 may verify the integrity of data provided from the client device 100 through mutual cross-verification.

Figure 2:
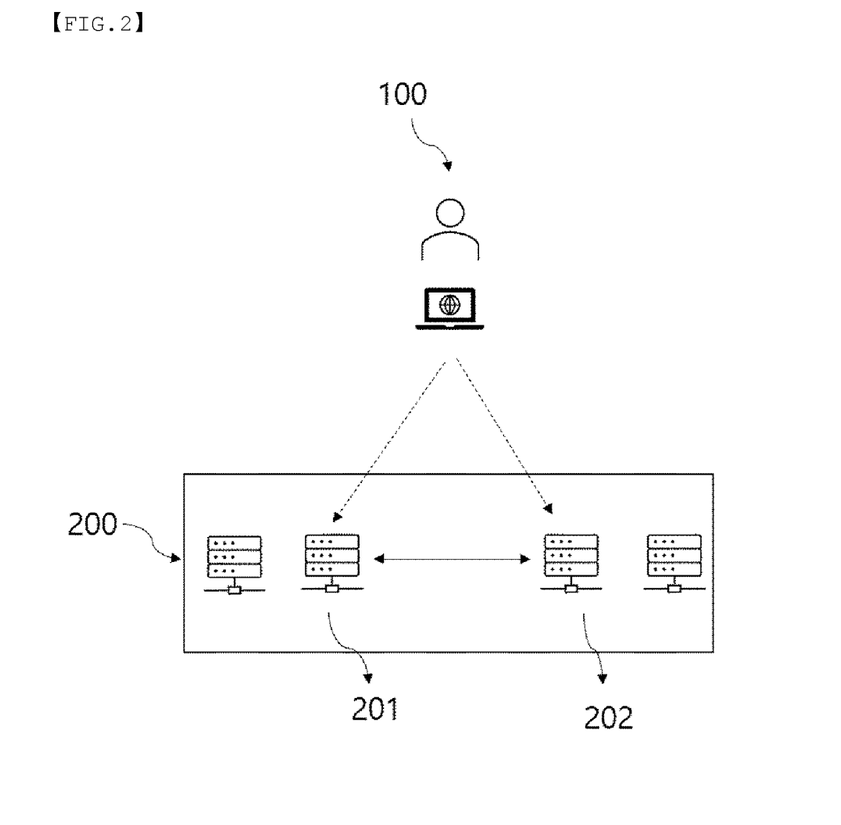
FIGS. 2 and 3 are diagrams for explaining the configuration of a relay server in more detail according to the present invention.

More specifically, as shown in FIG. 2, each of a first relay server 201 and a second relay server 202 included in the relay server 200 and receiving the original digital content from the client device 100 may verify the integrity of the data provided from the client device 100 by performing mutual verification for the hash of the original digital content. The mutual verification for the hash may signify, for example, mutual verification for a unique hash value and a secret hash key included in the hash, but is not limited thereto, and may signify individual mutual verification for all information included in the hash.

Meanwhile, the relay server 200 stores data about the original digital content provided by the client device 100 and a hash thereof, and a scheme of transmitting the data to the blockchain network 300 may be, for example, a client-client scheme adopted by the IPFS server.

In one example, the relay server 200 may be a IPFS server which is a distributed file system having a client-client structure composed of a plurality of IPFS nodes. In this case, the IPFS server may distributively store the original digital content in the IPFS nodes and generate an IPFS hash for the original digital content, and the IPFS hash may include a hash value for the original digital content, a secret hash key, owner information of the original digital content, and a contract for use of the original digital content.

Figure 3:
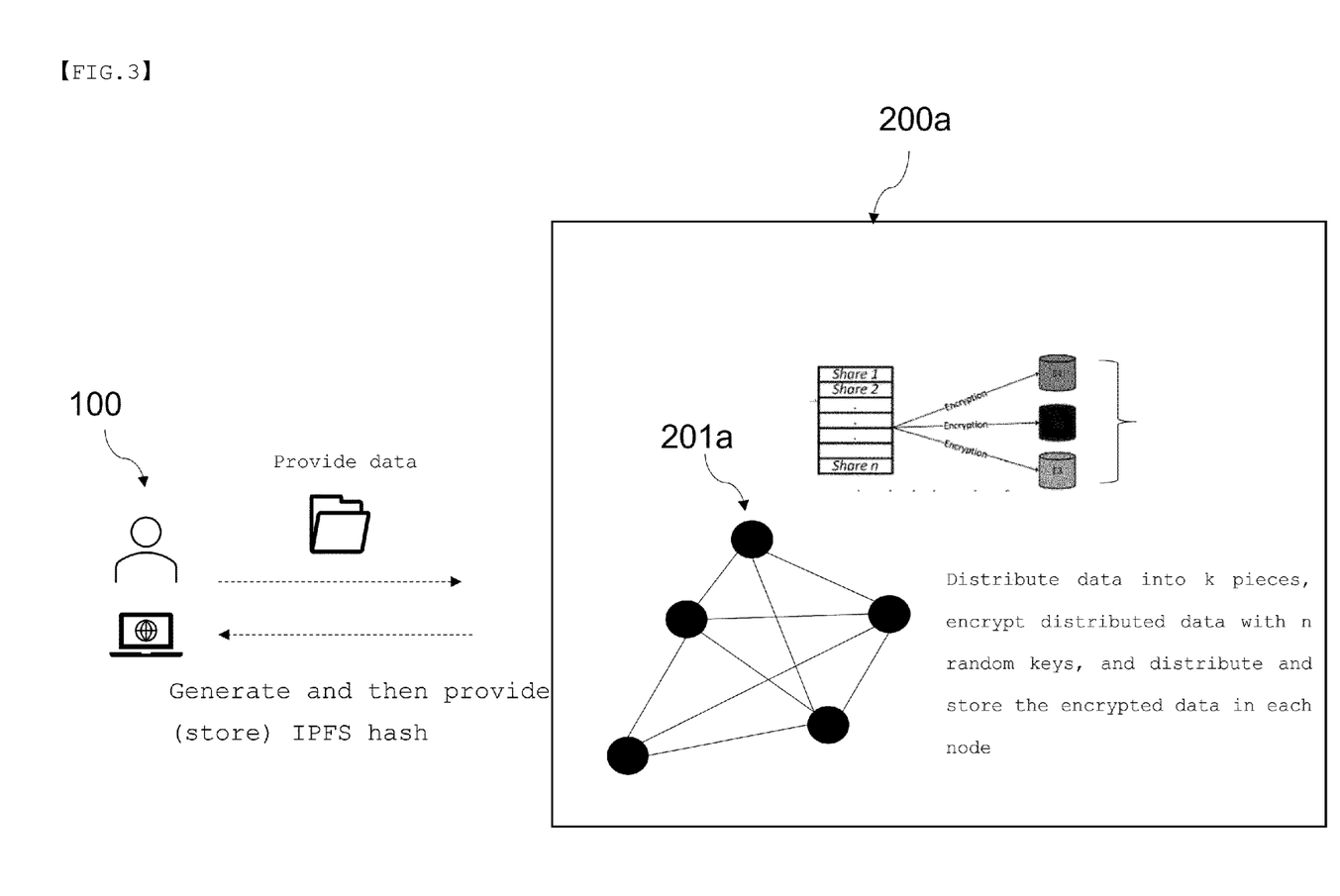

FIG. 3 shows a diagram for describing in detail a scheme of exchanging data and hash with the client device 100 and a scheme of storing the data when the relay server 200 according to the present invention is the IPFS server 200a.

As shown in FIG. 3, the original digital content provided by the client device 100 may be distributed into k pieces of data based on the shamir secret sharing (SSS) algorithm by any one node 201a of a plurality of IPFS nodes included in the IPFS server 200a, encrypted with n random keys, and distributively stored in each node. In this case, a hash corresponding to the original digital content data may be generated as an IPFS hash, and then the generated hash may be provided to the client device 100 so that the copyright holder of the original digital content may be allowed to access the data uploaded by the copyright holder. As shown in FIG. 3, when a protocol for distributively storing the original digital content is adopted, data may be effectively and stably stored, read, and shared without control of a central server.

In addition, the relay server 200 may separately extract information about the copyright holder who has provided the original digital content from the IPFS hash, and provide the extracted information to a third party who intends to obtain permission to use the original digital content.

In one example, the relay server 200 may include a copyright holder information providing server (not shown) for extracting information about the copyright holder from a hash of the original digital content provided from the client device 100 and separately storing the extracted information so that the third user may view the information about the copyright holder of the original digital content with the naked eye. The copyright holder information providing server may be a centralized server existing on a network different from the sub-relay server, the node, or the IPFS node described above, or may be a decentralized server, as a client-client type server similar to the relay server 200, including a plurality of nodes for storing copyright holder information data.

The blockchain network 300 includes a plurality of nodes 301 that record a smart contract on a blockchain and perform verification for the recorded smart contract.

Specifically, the blockchain network 300 includes a plurality of nodes 301 that perform mining on a block including a transaction generated by distribution of a smart contract for the original digital content to distribute the mined block on a network, and that perform comparison and verification between a sub-smart contract linked to the smart contract for the original digital content included in the mined block and a smart contract for a digital content produced using the original digital content on a WebAssembly virtual machine.

As described above, the blockchain network 300 according to the present invention includes a plurality of nodes designed based on a WebAssembly to mine a block including a smart contract that can be executed, modified, and read on the WebAssembly virtual machine.

When the smart contract is generated and distributed, mined by the node, and then stored on the blockchain, the client device 100 having provided the original digital content generates a smart contract having attributes and variables based on the IPFS hash and distributes the generated smart contract in the form of a transaction on the blockchain network. Thereafter, any one of the nodes performs mining on the block including the transaction generated by the smart contract distribution to receive a reward, and the corresponding block is recorded on the blockchain together with the generation of a smart contract account address. Therefore, each node of the blockchain network shares the same smart contract. Meanwhile, a smart contract byte code, a sender, and the like may be input to the distributed smart contract, and the blockchain network according to the present invention may be implemented in the WebAssembly-based virtual machine installed in the blockchain. Thus, a fee to be used may be additionally input to the smart contract.

The smart contract for the original digital content stored in the block in the above-described manner has a WebAssembly module form executable by the WebAssembly virtual machine, and specifically, the smart contract stored in the block may have a form of a WebAssembly module driven on the WebAssembly virtual machine to serve as a WebAssembly module in which a smart contract source code is compiled and converted into a binary byte code. Therefore, each of the nodes may include a transaction having a WebAssembly module driven on a WebAssembly virtual machine as a WebAssembly module in which a smart contract source code is compiled and converted into a binary byte code.

In addition, the smart contract for the original digital content recorded on the blockchain may be executed by the WebAssembly virtual machine through each node, and may be modified and changed as well as viewed.

Specifically, regarding the smart contract for the original digital content recorded on the blockchain, a general user (a secondary copyright holder) may access the smart contract for the original digital content through each node and request authority for sharing, distributing, editing, copying, or modifying the original copyright according to contract conditions described in the smart contract, a smart contract of the secondary copyright holder may be generated according to the approval of the original copyright holder, and the generated smart contract of the secondary copyright holder may be linked to the smart contract of the original copyright holder.

Figure 4:
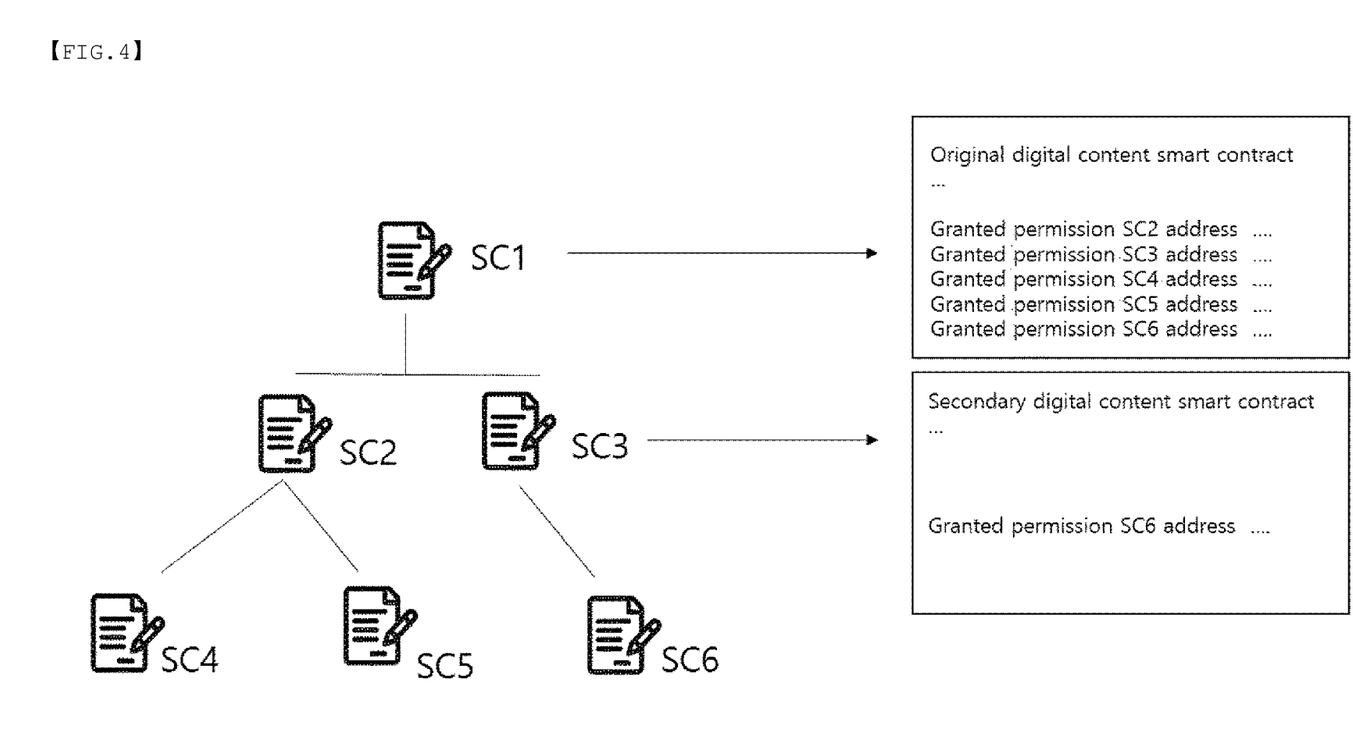
FIG. 4 is a diagram for explaining that a smart contract for an original digital content is link to a sub-smart contract for a digital content produced using the smart contract according to an exemplary embodiment of the present invention.

More specifically, as shown in FIG. 4, a smart contract (parent smart contract; SC1) of the original digital content may be linked to a smart contract (child smart contract; SC2, SC3) of a secondary copyright holder authorized to share, distribute, edit, copy, or modify the original digital content, and a smart contract (grandchild smart contract; SC4, SC5, SC6) of a tertiary copyright holder may also be linked to the smart contract (child smart contract; SC2, SC3) of the secondary copyright holder. The link of the smart contract signifies that information about the child and grandchild smart contracts is recorded on the parent smart contract and is in a state that can be tracked. The information about the smart contract may include a smart contract account address, smart contract owner information, or a token account address for driving the blockchain network.

In addition, each node included in the blockchain network performs comparison and verification between the smart contract for the original digital content included in the mined block and the smart contract for the digital content created using the original content, on the WebAssembly virtual machine.

Specifically, each of the nodes may perform comparison and verification between the smart contract for the original digital content obtained through decompiling of the WebAssembly module and the smart contract for the digital content produced using the original digital content, on the WebAssembly virtual machine.

Figure 5:
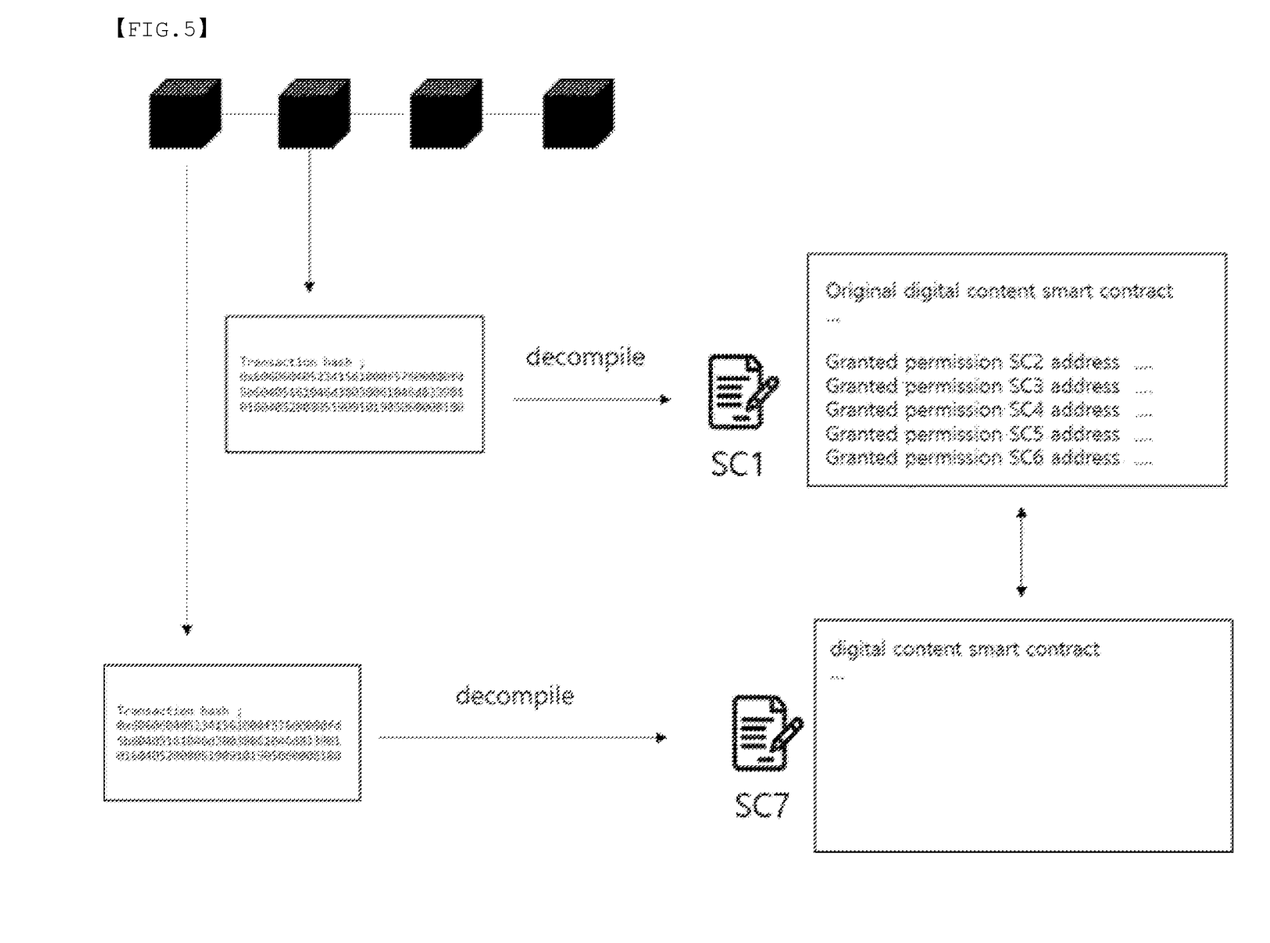
FIG. 5 is a diagram for explaining a smart contract verification function performed by each of a plurality of nodes in more detail according to the present invention.

More specifically, as shown in FIG. 5, the information about the child smart contract or the grandchild smart contract obtained by decompiling the smart contract SC1 for the original digital content existing on the block of a blockchain on a WebAssembly virtual machine may be compared with the smart contract SC7 for the digital content produced using the original digital content, so as to verify whether the digital content associated with the corresponding smart contract SC7 has obtained a legitimate permission from the client device 100 having provided the original digital content, that is, the original copyright holder, thereby determining whether the original digital content is forged or falsified.

The node performing comparison and verification on the WebAssembly virtual machine may be any one or more of a plurality of nodes included in the blockchain network, in which nodes performing mining and nodes performing verification may be distinguished from each other in terms of stability, speed improvement, and verification accuracy improvement of the network according to role sharing.

In one example, the nodes may include a first node group for mining a block including a transaction for generating a smart contract for the original digital content; and a second node group for performing verification between a smart contract for the original digital content included in the mined block and a smart contract for the digital content produced using the original digital content, on a WebAssembly virtual machine.

The system as described above can: verify an original digital content itself; clearly detect whether a digital content derived from the original digital content is forged or falsified; easily track an original work; secure a source of a secondary work; have a high degree of freedom in selecting a smart contract language; and operate in a web environment with near-native performance, thereby improving system versatility and extensibility.

The present invention also relates to a method for determining whether a digital content is forged or falsified using the above-described system.

Figure 6:
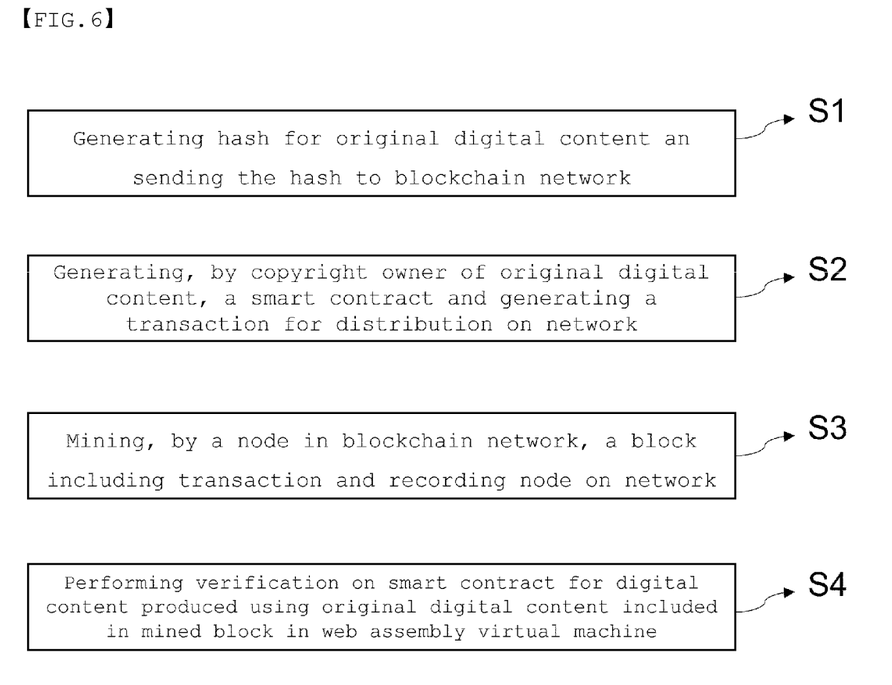
FIG. 6 is a block diagram for explaining steps of a method for determining forgery or falsification of a digital content using a WebAssembly-based blockchain platform according to the present invention.

As shown in FIG. 6, the method for determining forgery or falsification of a digital content using a WebAssembly-based blockchain platform according to the present invention includes: a step (S1) in which a relay server 200 generates a hash for an original digital content provided by a client device 100 and transmits the generated hash to a blockchain network 300; a step (S2) in which the client device 100 providing the original digital content generates a smart contract for the original digital content by using the hash generated by the relay server 200 as an attribute, and generates a transaction for distributing the smart contract on the blockchain network 300; a step (S3) in which any one of a plurality of nodes in the blockchain network mines a block including a transaction generated by distribution of the smart contract to receive a reward, and records a block including the transaction generated by the distribution of the smart contract on the blockchain; and a step (S4) in which any one of the nodes in the blockchain network performs comparison and verification, on a WebAssembly virtual machine, between the smart contract for the original digital content included in the mined block and the smart contract for a digital content produced using the original digital content.

In addition, the method for determining forgery or falsification of a digital content using a WebAssembly-based blockchain platform according to the present invention may further include: a step in which each relay server having received the original digital content performs mutual verification for a hash of the provided digital content.

The method for determining forgery or falsification of a digital content using a WebAssembly-based blockchain platform according to the present invention is implemented by operations and functions of the configurations described in the above-mentioned system, and the detailed operations and functions thereof are the same as those described in the above-mentioned system.

Although the system for determining forgery or falsification of a digital content using a WebAssembly-based blockchain platform and the method for determining forgery or falsification of a digital content using the same according to the present invention have been described above with reference to the drawings, it will be obvious to those skilled in the art that this is merely an example of the present invention and the major technical idea or scope of the present invention is not limited by the drawings.

DESCRIPTION OF REFERENCE NUMERALS

100: Client device
200: Relay Server
201 First and second relay servers
200a: IPFS Server
201a: IPFS node
300: Blockchain network
301: Blockchain node

The invention claimed is:

1. A system for determining forgery or falsification of a digital content using a WebAssembly-based blockchain platform, the system comprising:
 a client device configured to provide an original digital content;
 a relay server including a first relay server and a second relay server each receiving the original digital content from the client device, the first and second relay servers configured to:
 receive the original digital content from the client device;
 generate, by each of the first relay server and the second relay server, an independent unique hash value and a secret hash key for the original digital content;
 perform mutual verification of the independent unique hash value and the secret hash key between the first relay server and the second relay server to verify data integrity, and block transmission of the hash to the blockchain network if the mutual verification fails;
 generate, upon successful verification, an IPFS hash for the original digital content; and
 transmit the IPFS hash to the blockchain network; and
 a blockchain network receiving the IPFS hash from the first and second relay servers, the blockchain network having a plurality of nodes configured to perform mining on a block including a transaction generated by distribution of a smart contract for the original digital content on the blockchain network, and to perform, on a WebAssembly virtual machine, comparison and verification between the smart contract for the original digital content included in the mined block and a smart contract for a digital content produced using the original digital content, wherein the relay server including the first relay server and the second relay server is an IPFS server comprising a distributed file system having a client-client structure composed of a plurality of IPFS nodes, and the original digital content is partitioned into k data fragments using a Shamir Secret Sharing algorithm, the k data fragments are encrypted with n random keys, and the encrypted data fragments are distributed across the plurality of IPFS nodes to generate the IPFS hash for the original digital content, the IPFS hash including a unique hash value for the original digital content, a secret hash key, owner information of the original digital content, and a contract for use of the original digital content, wherein each of the plurality of nodes, in performing the comparison and verification, decompiles a WebAssembly module of the smart contract for the original digital content included in the mined block to obtain the smart contract for the original digital content, compares the smart contract for the original digital content with the smart contract for the digital content produced using the original digital content, and verifies consistency of a link between the smart contracts by confirming that a smart contract account address of the smart contract for the original digital content matches a smart contract account address of the smart contract for the digital content produced using the original digital content, wherein the smart contract for the original digital content includes information indicating authorized use of the original digital content by one or more digital contents produced using the original digital content, wherein the plurality of nodes are configured to determine, based on the information included in the smart contract for the original digital content, whether the digital content produced using the original digital content has obtained legitimate permission from an owner of the original digital content.

2. The system of claim 1, wherein the original digital content comprises one or more of a voice content, a video content, an image content, and a text content.

3. The system of claim 1, further comprising
a copyright holder information providing server configured to extract and separately store the owner information of the original digital content from the IPFS hash, such that a third user is allowed to view the owner information of the original digital content with a naked eye.

4. The system of claim 1, wherein each of the plurality of nodes includes a transaction having the WebAssembly module executed on the WebAssembly virtual machine, the WebAssembly module comprising a compiled binary byte code of a smart contract source code.

5. The system of claim 1, wherein
the plurality of nodes include:
a first node group that mines a block including a transaction generated by distribution of the smart contract for the original digital content on the blockchain network; and
a second node group that performs, on the WebAssembly virtual machine, comparison and verification between the smart contract for the original digital content included in the mined block and the smart contract for the digital content produced using the original digital content.

6. A method for determining forgery or falsification of a digital content using a WebAssembly-based blockchain platform, the method comprising:
providing, by a client device, an original digital content;
receiving, at a first relay server and at a second
relay server, the original digital content from the client device;
generating, by each of the first relay server and the second relay server, an independent unique hash value and a secret hash key for the original digital content;
performing mutual verification of the independent unique hash value and the secret hash key between the first relay server and the second relay server to verify data integrity, and blocking transmission of the IPFS hash to the blockchain network if the mutual verification fails;
generating, upon successful verification, an IPFS hash for the original digital content by partitioning the original digital content into k data fragments using a Shamir Secret Sharing algorithm, encrypting the k data fragments with n random keys, and distributing the encrypted data fragments across a distributed file system having a client-client structure composed of a plurality of IPFS nodes, such that the IPFS hash includes a unique hash value for the original digital content, a secret hash key, owner information of the original digital content, and a contract for use of the original digital content;
transmitting the IPFS hash to a blockchain network;
mining, by the blockchain network, a block including a transaction generated by distribution of the smart contract for the original digital content on the blockchain network;
performing, by each of a plurality of nodes of the blockchain network on a WebAssembly virtual machine, comparison and verification between the smart contract for the original digital content included in the mined block and a smart contract for the digital content produced using the original digital content, including decompiling a WebAssembly module of the smart contract for the original digital content included in the mined block to obtain the smart contract for the original digital content and confirming that a smart contract account address of the smart contract for the original digital content matches a smart contract account address of the smart contract for the digital content produced using the original digital content;
wherein the smart contract for the original digital content includes information indicating authorized use of the original digital content by one or more digital contents produced using the original digital content; and
wherein the method further comprises determining, by the plurality of nodes, based on the information included in the smart contract for the original digital content, whether the digital content produced using the original digital content has obtained legitimate permission from an owner of the original digital content.

7. The method of claim 6, wherein each of the first relay server and the second relay server, having received the original digital content, performs mutual verification of a hash of the original digital content.

* * * * *